(12) United States Patent
Villagran et al.

(10) Patent No.: US 7,018,668 B2
(45) Date of Patent: *Mar. 28, 2006

(54) LOW FAT CREAMER COMPOSITIONS

(75) Inventors: Francisco Valentino Villagran, Mason, OH (US); John Michael Baughman, Loveland, OH (US)

(73) Assignee: Procter & Gamble Co., Cincinnati, OH (US)

( * ) Notice: Subject to any disclaimer, the term of this patent is extended or adjusted under 35 U.S.C. 154(b) by 176 days.

This patent is subject to a terminal disclaimer.

(21) Appl. No.: 10/359,899

(22) Filed: Feb. 6, 2003

(65) Prior Publication Data

US 2004/0156979 A1 Aug. 12, 2004

(51) Int. Cl.
  *A21D 9/15* (2006.01)

(52) U.S. Cl. .................. 426/580; 426/588; 426/656; 426/657

(58) Field of Classification Search ........... 426/656, 426/580, 657, 588
See application file for complete search history.

(56) References Cited

U.S. PATENT DOCUMENTS

| | | | |
|---|---|---|---|
| 2,469,553 A | 5/1949 | Hall | |
| 2,750,998 A | 6/1956 | Moore | |
| 2,771,343 A | 11/1956 | Chase et al. | |
| 2,978,446 A | 4/1961 | Battista et al. | |
| 3,023,104 A | 2/1962 | Battista | |
| 3,141,875 A | 7/1964 | Battista et al. | |
| 3,436,227 A | 4/1969 | Bergeron et al. | |
| 3,493,388 A | 2/1970 | Hair | |
| 3,615,669 A | 10/1971 | Hair et al. | |
| 3,620,756 A | 11/1971 | Strobel et al. | |
| 3,652,293 A | 3/1972 | Lombana et al. | |
| 4,338,346 A | 7/1982 | Brand | |
| 4,399,163 A | 8/1983 | Brennan et al. | |
| 4,411,925 A | 10/1983 | Brennan et al. | |
| 4,423,029 A | 12/1983 | Rizzi | |
| 4,734,287 A | 3/1988 | Singer et al. | |
| 4,748,949 A | 6/1988 | Steiger et al. | |
| 4,961,953 A | 10/1990 | Singer et al. | |
| 4,985,270 A * | 1/1991 | Singer et al. | 426/565 |
| 6,180,159 B1 * | 1/2001 | Villagran et al. | 426/590 |
| 6,824,810 B1 * | 11/2004 | Sargent et al. | 426/588 |

FOREIGN PATENT DOCUMENTS

EP 168112 1/1986

* cited by examiner

*Primary Examiner*—Anthony Weier
(74) *Attorney, Agent, or Firm*—Bryn T. Lorentz; S. Robert Chuey

(57) ABSTRACT

A non-fat creamer composition that contains from about 10% to about 90%, of a microparticulated protein component and from about 10% to about 90%, of a insoluble microcrystalline cellulose component. In the hydrated state the microparticulated protein component particles have a mean diameter particle size distribution ranging from about 0.1 microns to about 10.0 microns, and preferably less than about 5 percent of the total number of particles exceed about 10.0 microns in diameter. Further, the creamer composition contains less than about 2% of fat and oil. These non-fat creamer compositions can be powdered and liquid, dairy and non-dairy, and can be prepared in both concentrated and ready-to-use forms. The powdered creamer compositions are well suited for use in instant and/or dry food and beverage compositions that require the addition of water or other suitable fluids prior to use.

12 Claims, No Drawings

LOW FAT CREAMER COMPOSITIONS

BRIEF DESCRIPTION OF THE INVENTION

The present invention relates to liquid and powdered dairy and non-dairy low fat creamer compositions and their use in food and beverage products.

BACKGROUND OF THE INVENTION

Commercially produced dairy and non-dairy creamers are an increasingly popular additive to or ingredient of many of today's food and beverage products. These food additives often improve the taste of food and beverages. But many consumers avoid their use because of concerns about the amount of fat and calories they add to the food or beverage product. Moreover, many of today's commercially produced creamer products lack the desired taste and texture consumers prefer, and many are simply too expensive to gain wide spread approval.

Pure, natural cream is a popular food and drink additive that has excellent taste, texture and mouth feel. But it too suffers from many of the defects mentioned above. Natural cream is very high in fat and calories, and is relatively expensive as well. Thus, while providing the desired sensory experience, there are substantial negative properties of adding natural cream to foods and beverages.

In an effort to produce a creamer product that overcomes the problems of high fat and calorie content formulators have tried a variety of different tactics. Water soluble polymers, such as starch, carboxymethyl cellulose gum, carrageenan gum, and xanthan gum are often used to formulate low fat creamer products. But these ingredients tend to increase viscosity of the product to which they are added. This can result in a slimy or slippery mouth feel that is generally not preferred by consumers. Such additives can also dilute food products, rendering them watery. Moreover, these inactive ingredients, typically bulking agents, suffer from the further deficiency of not being able to withstand the heat and pressure conditions that are part of the food and beverage sterilization and stabilization techniques commonly employed. Thus, while these additives tend to be low fat and affordable, their taste, texture, mouth feel and shelf stability leave much to be desired.

Accordingly there exists a need for improved creamer compositions that are non fat and low calorie and that have improved taste, texture and mouth feel when compared to current commercially produced creamer compositions. These creamer compositions should be shelf stable and approximate the taste and texture of natural cream but without the fat and calories associated with natural cream. Moreover, there exists a need for nonfat creamers that are inexpensive and easy to manufacture. These creamers should be available in both powdered and liquid form, and more preferably they are concentrated such that they provide the benefits discussed without the necessity for unduly large doses. These and other benefits are provided by the present invention.

SUMMARY OF THE INVENTION

In one aspect of the present invention there is provided a non-fat creamer composition comprising from about 10% to about 90%, by weight of the dry composition, of a microparticulated protein component, and from about 10% to about 90%, by weight of the dry composition, of an insoluble microcrystalline cellulose component. Further, in a hydrated state the microparticulated protein component particles have a mean diameter particle size distribution ranging from about 0.1 microns to about 10.0 microns, with less than about 5 percent of the total number of particles exceeding about 10.0 microns in diameter. And the creamer composition contains less than about 2%, preferably less than about 1%, more preferably less than about 0.5% and most preferably less than about 0.1%, by weight of the dry composition, of fat and oil. Optionally, the non-fat creamer composition may further comprising from about 0.1% to about 10%, by weight of the dry composition, of a bulking agent.

In an preferred embodiment of the present invention, the non-fat creamer composition is essentially free of fat and oils selected from the group consisting of soybean oil, canola (low erucic acid) oil, corn oil, cottonseed oil, peanut oil, safflower oil, sunflower oil, rapeseed oil, sesame oil, olive oil, coconut oil, palm kernel oil, palm oil, tallow, butter, lard, fish oil, and mixtures thereof. Moreover, the protein component is preferably selected from the group consisting of plant proteins, dairy proteins, animal proteins, and mixtures thereof.

In yet another aspect of the present invention, the non-fat creamer composition is essentially free of soluble carbohydrate components selected from the group consisting of gum arabic, starch, calcium alginate, cross-linked alginates, dextran, gellan gum, curdlan, konjac mannan, chitin, schizophyllan and chitosan, and mixtures thereof. More specifically, the non-fat creamer composition is essentially free of water soluble polymers selected from the group consisting of starch, carboxymethyl cellulose gum, carrageenan gum, xanthan gum and mixtures thereof.

And in yet another aspect of the present invention there is provided a non-fat beverage comprising from about 0.1% to about 10%, by weight, of the non-fat creamer composition according to the present invention.

The non-fat creamer compositions of this invention can be powdered and liquid, dairy and non-dairy creamer compositions. These creamer compositions can be prepared in both concentrated and ready-to-use forms. The powdered creamer compositions are well suited for use in instant and/or dry food and beverage compositions that require the addition of water or other suitable fluids prior to use. The present powdered and liquid creamer compositions are equally well suited for the preparation of ready-to-use formulations that can be added directly to food and beverage products.

In addition to having no fat and fewer calories, the creamer compositions of the present invention deliver a creamier, richer, improved mouth feel and thickness over conventional creamer compositions for the same volume of formula. Yet another benefit of the present powdered and liquid, dairy and non-dairy creamer compositions are their ability to withstand exposure to conventional treatments for food and beverage products that reduce biological activity and/or promote microbial stability.

DETAILED DESCRIPTION OF THE INVENTION

The present invention encompasses processes for the production of powdered and liquid, dairy and non-dairy creamer compositions, in particular powdered and liquid, dairy and non-dairy creamer compositions with a high degree of functionality. The present invention will now be described in detail with reference to specific embodiments.

DEFINITIONS

Various publications and patents are referenced throughout this disclosure. All references cited herein are hereby incorporated by reference. Unless otherwise indicated, all percentages and ratios are calculated on a dry weight basis. All percentages and ratios are calculated based on the total dry composition unless otherwise indicated. "Essentially free of", as used herein means that the referenced composition contains less than about 2%, preferably less than about 1%, more preferably less than about 0.5%, and most preferably less than about 0.1%, by weight of the dry composition, of the excluded component.

All component or composition levels are in reference to the active level of that component or composition, and are exclusive of impurities, for example, residual solvents or by-products, which may be present in commercially available sources.

Referred to herein are trade names for components including various ingredients utilized in the present invention. The inventors herein do not intend to be limited by materials under a certain trade name. Equivalent materials (e.g., those obtained from a different source under a different name or catalog number) to those referenced by trade name may be substituted and utilized in the compositions herein.

Non-Fat Creamer Compositions

The creamer compositions of the present invention comprise a microparticulated protein ingredient component and a insoluble microcrystalline cellulose component, and is essentially free of fats and oils. Additional ingredients such as flavorants, beverage solids, sweeteners, foaming systems, processing aids, and the like may also be present.

Microparticulated Protein Component

The non-fat creamer compositions of the present invention comprise a microparticulated protein component. The exact amount of the protein component is dependent on the specific creamer formulation and ingredients selected. Preferably the microparticulated protein is present in the non-fat creamers of the present invention in an amount of from 10% to about 90%, more preferably from about 35% to about 85%, and even more preferably 40% to about 75%, by weight of the dry composition.

These microparticulated protein component can be prepared from any protein that can attain a substantially spheroidal or substantially round shape in a diameter size range of from about 0.1 microns to about 10 microns, preferably in the range of from about 0.1 microns to about 8 microns, more preferably in the range of from about 0.1 microns to about 5 microns.

The preferred protein for a particular use may vary according to considerations of availability, expense, and flavor associated with the protein. Additionally, the degree and nature of impurities and other components in the protein source may be considered. Preferred proteins of the present invention are those proteins that are substantially soluble in their undenatured state, and, which undergo denaturation and insolublization upon exposure to heat denaturing temperatures or denaturing pH. Suitable protein sources include plant, dairy, and other animal protein sources.

It has been determined according to the present invention that heat-stable, water dispersible protein particles, which in a hydrated state have a substantially smooth, emulsion-like, organoleptic character, may be produced from a variety of protein materials. Preferred proteins for preparing the microparticulated protein component of the present invention include egg and milk proteins, plant proteins (including oilseed proteins obtained from cotton, palm, rape, safflower, cocoa, sunflower, sesame, soy, peanut, and the like), microbial proteins such as yeast proteins, so-called "single cell" proteins, and mixtures thereof. Preferred proteins also include dairy whey protein (including sweet dairy whey protein), and non-dairy proteins such as bovine serum albumin, egg white albumin, and vegetable whey proteins (i.e., non-dairy whey protein) such as soy protein. Especially preferred proteins for use in the present invention include whey proteins, such as $\beta$-lactoglobulins and $\alpha$-lactalbumins; bovine serum albumins; egg proteins, such as ovalbumins; and, soy proteins, such as glycinin and conglycinin. Combinations of these especially preferred proteins are also acceptable for use in the present invention. Of these, whey and soy protein are the most preferred.

Preferred sources for the microparticulated protein particles herein include, but are not limited to, partially insoluble, partially denatured protein compositions such as Simplesse 100®, available from the CP-Kelco Company of San Diego, Calif. and DAIRY-LO® from The Pfizer Company of New York, N.Y., both of which are whey proteins. Examples of these preferred protein sources are disclosed in U.S. Pat. No. 4,734,287 to Singer et al., issued Mar. 29, 1988; and U.S. Pat. No. 4,961,953 to Singer et al., issued Jun. 16, 1989, both of which are herein incorporated by reference. Especially preferred protein particle sources for use in the compositions of the present invention, and methods for making such protein particles sources, are disclosed in co-pending U.S. patent application Ser. No. 09/885,693, filed Jun. 22, 2001 to Francisco V. Villagran et al., which is herein incorporated by reference.

Preferred microparticulated protein particles can be prepared from solutions of partially insoluble, partially denatured protein compositions through controlled application of heat and high shear conditions facilitative of controlled protein denaturation in a physical and chemical context allowing for the formation of non-aggregated, proteinaceous microparticles of the desired size and shape. The particles formed during denaturation are generally spherical in shape and have average diameters in excess of about 0.1 microns. The formation of particles in excess of about 10 microns in diameter and/or formation of aggregates of small particles with aggregate diameters in excess of 10 microns is substantially avoided. Alternatively, the formation of particles or aggregates of particles having volumes in excess of 5.5 cubic microns is avoided while forming substantial numbers of particles having volumes of $5 \times 10^{-4}$ cubic microns or more.

The protein denaturing temperatures employed and the duration of heat treatment will vary depending upon the particular protein starting material. In a like manner, the specific high shear conditions including the duration of shear applied to protein solutions will also vary. During the denaturation processing, undenatured proteins in solution interact to form insoluble coagulates, and the controlled application of heat and high shear forces operate to insure formation of non-aggregated particles within the desired size range. Depending on the protein source selected, the rate of denaturation and the rate of insolublization may differ. Also, depending upon the specific properties of dissolved protein materials and the properties of non-protein constituents in the solutions of these materials, the application of heat and high shear alone may not optimally allow for the avoidance of oversized particle aggregates. In such situations, one or more materials such as lecithin, xanthan gum, maltodextrins, sugars, carageenan, datem esters, alginates, and the like, (referred to as "aggregate blocking agents") can preferably be added to the protein solutions, most preferably prior to heat denaturation processing.

In one embodiment of the present invention the proteins are derived from a dairy protein source, in particular whey proteins. It is recognized that protein sources suitable for use in the present invention may contain various impurities and by-products. For example, whey protein concentrates can comprise as much as 40% lactose. The presence of such materials does not substantially affect the process herein. If desired, lactose-free products can be prepared by using conventional extraction procedures.

Insoluble Microcrystalline Cellulose Component

The non-fat creamer compositions of the present invention comprise a insoluble microcrystalline cellulose component. Preferably the insoluble microcrystalline cellulose is present in the non-fat creamers of the present invention in an amount of from 10% to about 90%, more preferably from about 15% to about 75%, and even more preferably 20% to about 65%, by weight of the dry composition.

Insoluble microcrystalline cellulose, which is also known in the art as "cellulose gel," is a non-fibrous form of cellulose that is prepared by partially depolymerizing cellulose obtained as a pulp from fibrous plant material with dilute mineral acid solutions. Following hydrolysis, the hydrocellulose is purified via filtration and the aqueous slurry is spray-dried to form dry, odorless, tasteless, porous particles having a broad size distribution in the range of from about 0.1 microns to about 15 microns. See U.S. Pat. No. 3,023,104, issued Feb. 27, 1962; U.S. Pat. No. 2,978,446; and U.S. Pat. No. 3,141,875, each of which is herein incorporated by reference, that disclose suitable methods of preparing the insoluble microcrystalline cellulose used herein. Suitable commercially available insoluble microcrystalline cellulose source include EMCOCEL®, from the Edward Mendell Co., Inc. and Avicel®, from FMC Corporation.

Suitable insoluble microcrystalline cellulose sources may also be produced through a microbial fermentation process. Commercially available insoluble microcrystalline cellulose produced by a fermentation process includes PrimaCEL™, available from The Nutrasweet Kelco Company of Chicago, Ill.

The microparticulated cellulose particles of the present invention preferably have a mean particle diameter size in the range of from about 0.1 microns to about 10 microns, preferably in the range of from about 0.1 microns to about 8 microns, more preferably in the range of from about 0.1 microns to about 5 microns.

Optional Ingredients

The powdered and liquid, dairy and non-dairy creamer compositions of the present invention may optionally comprise additional ingredients, which may include such optional ingredients as bulking agents, flavorants, milk solids, soluble beverage components, buffers and buffering systems, natural and artificial sweeteners, thickeners, foaming agents and foaming systems, processing aids, and mixtures thereof.

Bulking Agents

Bulking agents are defined herein as those ingredients that do not substantially contribute to the overall mouthfeel, texture, or taste of the powdered and liquid, dairy and non-dairy creamer compositions of the present invention. The primary purpose of bulking agents is to control the overall concentration of solids in solution. Control of the solids level in solution aides in controlling the final particle size and density of the creamer compositions during various composition drying process, particularly spray drying. Control over the solids level also aides in controlling the viscosity of the liquid creamer composition during processing, and in the final, ready-to-use form of the composition. Bulking agents preferably have a high degree of solubility in solution and should undergo little or no reaction with other creamer composition ingredients. Preferably the bulking agents, if used, are present in the non-fat creamers of the present invention in an amount of from 0.1% to about 10%, more preferably from about 0.2% to about 7.5%, and even more preferably 0.5% to about 5%, by weight of the dry composition.

Suitable bulking agents are selected from the group consisting of corn syrup solids, maltodextrin and various dextrose equivalents, starches, and mixtures thereof. Corn syrup solids are particularly preferred bulking agents because of their cost and processablity.

Milk Solids.

The creamer compositions of the present invention may optionally comprise non-microparticulated dairy proteins (e.g., milk solids). These milk solids can be prepared by drying milk to produce a mixture of the proteins, minerals, whey and other components of milk in a dry form. The milk solids may include butterfat solids in small amounts and cream powder, and preferably include low-fat dry milk and non-fat milk solids. Especially preferred milk solids are those milk solids derived from milk that has had the fat removed.

Suitable milk solids for use in the present invention can be derived from a variety of commercial sources. Dry mixes typically used to prepare ice cream, milk-shakes, and frozen desserts may also be included in the creamer compositions herein. These dry mixes provide an especially creamy, rich mouthfeel to the creamer composition when the creamer compositions of the present invention are mixed with water or other beverage or food product.

Soluble Beverage Components.

The creamer compositions of the present invention may optionally comprise soluble beverage components. Suitable soluble beverage components are readily available to, and can be easily chosen by, one having ordinary skill in the art. Soluble beverage components include, but are not limited to, coffee, tea, juice, and mixtures thereof. The soluble beverage components may be in liquid, solid concentrate, powder, extract, or emulsion form.

The preferred soluble beverage component for use in a given flavored beverage product containing the creamer compositions of the present invention is determined by the particular application of the creamer composition product. For example, if the final application is intended to be a coffee beverage, the soluble beverage component is, generally, coffee. For a tea or juice beverage product, the soluble beverage component is generally, tea or juice, respectively.

Suitable soluble coffee components, for use in a given flavored beverage product containing the creamer compositions of the present invention, can be prepared by any convenient process. A variety of such processes are known to those skilled in the art. Typically, soluble coffee is prepared by roasting and grinding a blend of coffee beans, extracting the roast and ground coffee with water to form an aqueous coffee extract, and drying the extract to form instant coffee. Soluble coffee useful in the present invention is typically obtained by conventional spray drying processes.

Representative spray drying processes that can provide suitable soluble coffee are disclosed in, for example, pages 382–513 of Sivetz & Foote, *COFFEE PROCESSING*

TECHNOLOGY, Vol. I (Avi Publishing Co. 1963); U.S. Pat. No. 2,771,343 (Chase et al), issued Nov. 20, 1956; U.S. Pat. No. 2,750,998 (Moore), issued Jun. 19, 1956; and U.S. Pat. No. 2,469,553 (Hall), issued May 10, 1949, each of which is incorporated herein by reference. Other suitable processes for providing instant coffee for use in the present invention are disclosed in, for example, U.S. Pat. No. 3,436,227 (Bergeron et al), issued Apr. 1, 1969; U.S. Pat. No. 3,493,388 (Hair), issued Feb. 3, 1970; U.S. Pat. No. 3,615,669 (Hair et al), issued Oct. 26, 1971; U.S. Pat. No. 3,620,756, (Strobel et al), issued Nov. 16, 1971; U.S. Pat. No. 3,652,293 (Lombana et al), issued Mar. 28, 1972, each of which is incorporated herein by reference.

In addition to spray dried instant coffee powders, instant coffee useful in the present invention can include freeze-dried coffee. The instant coffee can be prepared from any single variety of coffees or a blend of different varieties. The instant coffee can be decaffeinated or undecaffeinated and can be processed to reflect a unique flavor characteristic such as espresso, French roast, or the like.

Buffers

The creamer compositions of the present invention may optionally comprise a buffering system. Suitable buffering systems for use herein are capable of maintaining the pH value of the finished, ready to consume food or beverage product including the present creamer compositions in the range of from about 5.5 to about 7.2. Preferred buffering systems comprise stabilizing salts capable of improving the colloidal solubility of proteins and simultaneously maintaining the pH value of a beverage in the range of from about 5.5 to 7.2, in order to achieve optimum stability and flavor.

Preferred stabilizing salts include the disodium and/or dipotassium salts of citric acid and/or phosphoric acid. The use of phosphate salts is particularly desirable when the water used for the preparation of the beverage is high in calcium or magnesium.

Suitable buffering systems for use in the creamer compositions of the present invention may also be combined with flavor profile mimicking, matching, manipulation and/or adjustment systems comprising various taste contributing acids and bases. Especially preferred flavor profile mimicking, matching, manipulation and/or adjustment systems for use in the present invention are disclosed in co-pending U.S. patent application Ser. No. 10/074,851, filed Feb. 13, 2002 to Hardesty et al., which is incorporated herein by reference.

Thickeners

The creamer compositions of the present invention may optionally comprise one or more thickening agents. As used herein, the term "thickening agent" includes natural and synthetic gums, and natural and chemically modified starches. It is preferred that the thickening agents of the present invention be comprised predominately of starches, and that no more than 20%, preferably no more than 10%, of the thickener be comprised of gums. It is understood that certain thickners suitable for use herein are soluble carbohydrates. As such, their use is not preferred although their use in small amounts or with other thickeners is acceptable.

Suitable starches for use herein include, but are not limited to, pregelatinized starch (corn, wheat, tapioca), pregelatinized high amylose content starch, pregelatinized hydrolyzed starches (maltodextrins, corn syrup solids), chemically modified starches such as pregelatinized substituted starches (e.g., octenyl succinate modified starches such as N-Creamer®, N-Lite LP®, and TEXTRA®, manufactured by the National Starch Company), as well as mixtures of these starches. Suitable gums for use herein include locust bean gum, guar gum, gellan gum, xanthan gum, gum ghatti, modified gum ghatti, tragacanth gum, carrageenan, and/or anionic polymers derived from cellulose such as carboxymethylcellulose, sodium carboxymethylcellulose, as well as mixtures of these gums.

Foaming Agents

The creamer compositions of the present invention may optionally comprise foaming agents and/or a foaming system for generating consumer preferred amounts of foam in a finished beverage product comprising the present creamer compositions. Suitable foaming systems for use in the present invention include any compound, or combination of compounds, capable of rendering a desired foam head, of a given height and density, in the finished beverage product.

The preferred foaming creamer for use herein comprises a creamer particle having entrapped gas. These particles are formed by making a liquid slurry of select creamer ingredients. The slurry is spray dried in the presence of a pressurized, inert gas such as nitrogen or air. The particles, when reconstituted, release the gas causing foaming. Foaming particles suitable for use herein are commercially available from, for example, Dean Foods of Dallas Tex. and Diehl Inc., of Defiance Ohio.

Moreover, processes for making these gasified particles are known, see for example, U.S. Pat. No. 4,748,040, which issued to Kuypers, on May 31, 1988. The entire disclosure of the Kuypers Patent is incorporated herein by reference. It will be understood by those in the art that instead of, or in combination with, commercially available foaming creamer particles, the components of the presently claimed non-fat creamer can be prepared in a liquid slurry and spray dried in the presence of an inert gas. Thus, the present composition would be gasified as shown in Example 4 below.

Less preferred, but generally acceptable foaming systems for use herein comprise an acid ingredient and a carbonate and/or bicarbonate ingredient, that when allowed to react together generate foam. As used herein, the term "acid ingredient" refers to an edible, water-soluble, organic or inorganic acid. Preferred acids include, but are not limited to, citric acid, malic acid, tartaric acid, fumaric acid, succinic acid, phosphoric acid, as well as mixtures of these acids. As used herein, the term "Carbonate" and "Bicarbonate" refer to an edible, water-soluble carbonate or bicarbonate salt that evolves carbon dioxide when it reacts with the acid ingredient. Preferred carbonate and bicarbonate salts include, but are not limited to, sodium bicarbonate, sodium carbonate, potassium bicarbonate, potassium bicarbonate, as well as any mixture thereof. Mixtures of sodium carbonate and sodium bicarbonate are especially preferred when used in combination with citric acid.

The foaming agents and/or foaming systems may optionally comprise one or more foam stabilizing ingredients. Suitable proteinaceous foam stabilizers include non-microparticulated egg white albumin (ovalbumin), whey protein, soy protein, soy protein isolate, corn protein isolate, as well as mixtures of these stabilizers. Non-microparticulated dried egg white albumin is particularly preferred because of its ability to form stable foams at relatively low concentrations.

Sweeteners

The creamer compositions of the present invention may optionally comprise one or more sweeteners. Preferred sweeteners for use in the present invention include, but are not limited to, sugars and sugar alcohols such as sucrose, fructose, dextrose, maltose, lactose, high fructose corn syrup solids, invert sugar, sugar alcohols, including sorbitol, as well as mixtures of these sugars and sugar alcohols.

In embodiments of the present invention where it is preferable to deliver lower levels of solids per dosage, it is particularly preferred to use a higher intensity sweetener with the sugar or sugar alcohol. These higher intensity sweeteners include saccharin; cyclamates; acesulfame K; L-aspartyl-L-phenylalanine lower alkyl ester sweeteners (e.g., aspartame); L-aspartyl-D-alanine amides, disclosed in U.S. Pat. No. 4,411,925 to Brennan et al.; L-aspartyl-D-serine amides, disclosed in U.S. Pat. No. 4,399,163 to Brennan et al; L-aspartyl-L-1-hydroxymethylalkaneamide sweeteners, disclosed in U.S. Pat. No. 4,338,346 to Brand et al.; L-aspartyl-1-hydroxyethyalkaneamide sweeteners, disclosed in U.S. Pat. No. 4,423,029 to Rizzi; and L-aspartyl-D-phenylglycine ester and amide sweeteners, disclosed in European Patent Application 168,112 to J. M. Janusz, published Jan. 15, 1986. Mixtures of the high intensity sweeteners disclosed herein, as well as mixtures of the high intensity sweeteners and sugars and sugar alcohols, are equally suitable for use in the creamer compositions of the present invention.

A particularly preferred sweetener system is a combination of sucrose with aspartame and acesulfame K. This mixture not only enhances sweetness, but also lowers the level of solids that is required in preparing the food and beverage products comprising the present creamer composition.

Processing Aids

The creamer compositions of the present invention may optionally comprise processing aids, including flow aids, anti-caking agents, dispersing aids, and the like. Preferred processing aides include, but are not limited to, flow aids such as silicon dioxide and silica aluminates. Starches, aside from the thickening agents, can also be included to keep the various ingredients from caking.

Flavorants

The creamer compositions of the present invention may optionally comprise one or more flavorants used to deliver one or more specific flavor impacts. Preferred flavors of the type used herein are typically obtained from encapsulated and/or liquid flavorants. These flavorants can be natural or artificial in origin. Preferred flavors, or mixtures of flavor, include almond nut, amaretto, anisette, brandy, cappuccino, mint, cinnamon, cinnamon almond, creme de menthe, Grand Mariner, peppermint stick, pistachio, sambuca, apple, chamomile, cinnamon spice, creme, creme de menthe, vanilla, French vanilla, Irish creme, Kahlua, mint, peppermint, lemon, macadamia nut, orange, orange leaf, peach, strawberry, grape, raspberry, cherry, coffee, chocolate, cocoa, mocha and the like, and mixtures thereof. The creamer compositions of the present invention may also comprise aroma enhancers such as acetaldehyde, herbs, spices, as well as mixtures thereof.

Water

In addition to existing in powdered form, the creamer compositions of the present invention may also be prepared in dilute, ready-to-use and concentrated liquid formulations by the addition of water. Generally, a concentrated liquid creamer formulation comprises from about 20% to about 60% on a total formula weight basis of water. A more dilute, ready-to-use liquid creamer formulation would generally comprise from about 61% to about 95% water on a total formula weight basis.

METHODS OF MAKING

The powdered and liquid, dairy and non-dairy creamer compositions of the present invention are prepared by starting with a sufficient amount of water and agitation. The microparticulated protein component and the insoluble microcrystalline cellulose component are then added to the water. If used, the bulking agent is added next, again in the presence of agitation, followed by any remaining optional ingredients. Agitation is continued until all dry ingredients are completely wetted.

The resulting mixture is then homogenized. The homogenizer is run at a first stage setting in the range of from about 300 psi to about 1000 psi, preferably in the range of from about 400 psi to about 800 psi, more preferably about 500 psi. The second stage of the homogenizer device is set to run at a pressure setting in the range of from about 1000 psi to about 3000 psi, preferably in the range of from about 1500 psi to about 2500 psi, more preferably about 2000 psi.

To produce the powdered creamer compositions of the present invention the resulting homogenized composition is dried to a free moisture content of less than about 7%, preferably less than about 5%, preferably to a free moisture content of less than about 4%. Once dried, the powdered creamer compositions may be packaged utilizing any of a variety of packaging techniques known in the art.

In one embodiment of the present invention the dried powdered creamer composition is packaged in a single serve portion package. In another embodiment the single serve portion of the powdered creamer composition is used in combination with a single-serve portion package of coffee that is used to make a coffee beverage. In yet another embodiment of the present invention the single-serve portion package contains a plurality of chambers wherein the coffee ingredients and the powdered creamer composition are each contained within separate chambers. In yet another embodiment the powdered creamer composition and the coffee ingredients are combined in one or more chambers of a single-serve portion package.

To produce the liquid creamer compositions of the present invention the step of drying the homogenized mixture is omitted. The liquid, homogenized mixture may instead be subject to one or more food and beverage sterilization processes, such as UHT and/or retorting, to render the compositions microbially stable and increase product shelf life. Optionally or additionally, the homogenized liquid creamer composition may be subjected to one or more additional processing steps such as, for example, concentrating. The liquid creamer compositions of the present invention may be prepared in dilute, ready-to-use formulations or may be prepared in liquid concentrated form, requiring the addition of additional amounts of water or other such fluid prior to consumption. Such concentrated liquid creamer compositions are particularly well suited for industrial and/or commercial applications.

Once the liquid creamer compositions have been prepared they may then be packaged using any one of a variety of aseptic or non-aseptic packaging processes know in the art. In one embodiment of the present invention a concentrated, liquid creamer composition is prepared, UHT processed and packaged in a large volume dispensing package suitable for use commercial applications. In another embodiment of the present invention liquid creamer composition is UHT processed and packaged in a single-serve portion package. In another embodiment the single-serve portion of the liquid creamer composition is used in combination with a single-serve portion package of powdered or liquid coffee that is used to make a coffee beverage. In yet another embodiment of the present invention the single-serve portion package contains a plurality of chambers wherein the coffee ingredients and the liquid creamer composition are each contained within separate chambers. In yet another embodiment, a single-serve portion of a concentrated liquid creamer composition is prepared and packaged with a single serve portion of a concentrated liquid coffee. The two concentrated liquids are packaged in a single-chamber beverage brewing device. Hot water is introduced to the single-chamber beverage brewing device in such a manner so as to dilute the two concentrates and prepare a single-serve portion of a creamy coffee beverage.

Examples

The following examples further describe and demonstrate embodiments within the scope of the present invention. These examples are given solely for the purpose of illustration and are not to be construed as a limitation of the present invention, as many variations thereof are possible without departing from the invention's spirit and scope.

Example 1

Table 1 illustrates a non-fat Low-calorie ready-to-drink coffee beverage comprising the non-fat creamer composition according to the present invention. This beverage was prepared by first mixing the Simplesse and Avicel powders and adding water under high shear mixing. Then the slurry is homogenized in an APV Gaulin Homogenizer at 7000 psi. The remaining ingredients are added under mixing until they are all dissolved. The product is then subjected to UHT processing, packed in sterile bottles, and kept under refrigeration conditions.

TABLE 1

| Ingredient | % by weight |
|---|---|
| Skim Milk | 40 |
| Acesulfame K | 0.01 |
| Sucralose* | 0.01 |
| Coffee Extract | 5 |
| Vanilla Extract | 0.5 |
| Simplesse 100** | 1.875 |
| Avicel*** | 0.625 |
| Water | 51.98 |
| TOTAL | 100.0 |

*Sucralose => Low-calorie sweetener
**Simplesse 100 => Microparticulated whey protein (CP Kelco)
***Avicel (AC-815) => Insoluble microcrystalline cellulose (FMC)

Example 2

Table 2 illustrates a non-fat liquid creamer according to the present invention. This composition is prepared by the same processing steps defined in Example 1.

TABLE 2

| Ingredient | % |
|---|---|
| Simplesse 100 | 18 |
| Avicel | 5 |
| Milk Protein concentrate | 8 |
| Sucrose | 20 |
| Acesulfame K | 0.15 |
| Dipotassium phosphate | 0.5 |
| Cocoa powder | 3.13 |
| Mocha Flavor Enhancer | 0.35 |
| Water | 44.87 |
| TOTAL | 100.0 |

Example 3

Table 3 illustrates a non-fat Cafe Latte powdered beverage containing a non-fat creamer composition according to the present invention. All of these ingredients are dry powders and they are mixed in a Hobart mixer for 5 minutes.

To prepare a fat-free Café Latte beverage, 10 grams of the power defined in Table 3 is dosed into an 8oz cup. 240ml of hot water (170–180° F.) is added and the mixture is stirred until all of the powder is dissolved.

TABLE 3

| Ingredient | % |
|---|---|
| Simplesse 100 | 54 |
| Avicel | 20 |
| Instant coffee | 10.2 |
| Cocoa | 2.6 |
| Acesulfame K | 0.25 |
| Sucralose | 0.25 |
| Dipotassium phosphate | 1.5 |
| Sodium Chloride | 0.4 |
| N&A Flavors | 10.8 |
| TOTAL | 100.0 |

Example 4

Table 4 illustrates a non-fat foaming creamer composition according to the present invention. This creamer was prepared by first mixing the Simplesse and Avicel powders and adding water under high shear mixing. Then the slurry is homogenized in an APV Gaulin Homogenizer at 7000 psi. The dispersion is gasified and spray dried using techniques to spray dry foaming creamer known to those skilled in the art.

TABLE 4

| Ingredient | % |
|---|---|
| Simplesse 100 | 7.5 |
| Avicel | 2.5 |
| Water | 90 |
| TOTAL | 100.0 |

Example 5

Table 5 illustrates a fat-free Café Latte with a frothy head. This frothy beverage contains a non-fat foaming creamer composition according to the present invention. All of these ingredients are dry powders and they are mixed in a Hobart mixer for 5 minutes.

To prepare a fat-free Café Latte beverage with a frothy head, 10 grams of the power defined in Table 5 is dosed into an 8 oz cup. 240 ml of hot water (170–180° F.) is added and the mixture is stirred until all of the powder is dissolved.

TABLE 5

| Ingredient | % |
|---|---|
| Dry Non-fat foaming creamer From Example 4 | 74 |
| Instant coffee | 10.2 |
| Cocoa | 2.6 |
| Acesulfame K | 0.25 |

TABLE 5-continued

| Ingredient | % |
|---|---|
| Sucralose | 0.25 |
| Dipotassium phosphate | 1.5 |
| Sodium Chloride | 0.4 |
| N&A Flavors | 10.8 |
| TOTAL | 100.0 |

Having now described several embodiments of the present invention it should be clear to those skilled in the art that the forgoing is illustrative only and not limiting, having been presented only by way of exemplification. Numerous other embodiments and modifications are contemplated as falling within the scope of the present invention as defined by the appended claims thereto.

We claim:

1. A non-fat creamer composition comprising:
   A) from about 10% to about 73%, by weight of the dry composition, of a microparticulated protein component:
   B) from about 27% to about 90%, by weight of the dry composition, of a insoluble microcrystalline cellulose component: wherein in a hydrated state the microparticulated protein component particles have a mean diameter particle size distribution ranging from about 0.1 microns to about 10.0 microns, with less than about 5 percent of the total number of particles exceeding about 10.0 microns in diameter, and wherein the creamer composition contains less than about 1%, by weight of the dry composition, of fat and oil.

2. The non-fat creamer composition of claim 1, wherein the non-fat creamer composition is prepared by a process that includes spray drying in the presence of an inert gas such that the resulting creamer particles are gasified.

3. The non-fat creamer composition of claim 1, further comprising from about 0.1% to about 10%, by weight of the dry composition, of a bulking agent.

4. The non-fat creamer composition of claim 1, wherein the non-fat creamer composition is essentially free of fat and oils selected from the group consisting of soybean oil, canola (low erucic acid) oil, corn oil, cottonseed oil, peanut oil, safflower oil, sunflower oil, rapeseed oil, sesame oil, olive oil, coconut oil, palm kernel oil, palm oil, tallow, butter, lard, fish oil, and mixtures thereof.

5. The non-fat creamer composition of claim 1, wherein the protein component is selected from the group consisting of plant proteins, dairy proteins, animal proteins, and mixtures thereof.

6. The non-fat creamer composition of claim 1, further comprising less than about 1%, by weight of the dry composition, of water soluble polymers selected from the group consisting of starch, carboxymethyl cellulose gum, carrageenan gum, xanthan gum and mixtures thereof.

7. The non-fat creamer composition of claim 1, further comprising less than about 1%, by weight of the dry composition, of soluble carbohydrate components selected from the group consisting of gum arabic, starch, calcium alginate, cross-linked alginates, dextran, gellan gum, curdlan, konjac mannan, chitin, schizophyllan and chitosan, and mixtures thereof.

8. The non-fat creamer composition of claim 1, further comprising an additional ingredient selected from the group consisting of flavorants, milk solids, soluble beverage components, buffers and buffering systems, natural and artificial sweeteners, thickeners, foaming agents and foaming systems, processing aids, and mixtures thereof.

9. The non-fat creamer composition of claim 1 wherein the creamer composition contains less than about 0.1%, by weight of the dry composition, of fat and oil.

10. The non-fat creamer composition of claim 1 further comprising less than about 0.1%, by weight of the dry composition, of water soluble polymers selected from the group consisting of starch, carboxymethyl cellulose gum, carrageenan gum, xanthan gum and mixtures thereof.

11. The non-fat creamer composition of claim 1 further comprising less than about 0.1%, by weight of the dry composition, of soluble carbohydrate components selected from the group consisting of gum arabic, starch, calcium alginate, cross-linked alginates, dextran, gellan gum, curdlan, konjac mannan, chitin, schizophyllan and chitosan, and mixtures thereof.

12. A non-fat beverage comprising from about 0.1% to about 10%, by weight, of the non-fat creamer composition according to claim 1.

\* \* \* \* \*